(12) United States Patent
Roeck et al.

(10) Patent No.: US 11,197,110 B2
(45) Date of Patent: Dec. 7, 2021

(54) RECHARGEABLE BATTERY WITH NON-METALLIC CASING FOR A HEARING DEVICE

(71) Applicant: Sonova AG

(72) Inventors: Hans-Ueli Roeck, Hombrechtikon (CH); Erich Dittli, Reichenburg (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/760,498

(22) PCT Filed: Nov. 10, 2017

(86) PCT No.: PCT/EP2017/078892
§ 371 (c)(1),
(2) Date: Apr. 30, 2020

(87) PCT Pub. No.: WO2019/091571
PCT Pub. Date: May 16, 2019

(65) Prior Publication Data
US 2021/0204078 A1    Jul. 1, 2021

(51) Int. Cl.
*H04R 25/00* (2006.01)
*H02J 50/10* (2016.01)
*H04R 1/10* (2006.01)

(52) U.S. Cl.
CPC ............ *H04R 25/602* (2013.01); *H02J 50/10* (2016.02); *H04R 1/1025* (2013.01); *H04R 25/554* (2013.01); *H04R 2225/31* (2013.01)

(58) Field of Classification Search
CPC .. H04R 25/602; H04R 1/1025; H04R 25/554; H04R 2225/31; H02J 50/10
USPC ........................................................ 381/323
See application file for complete search history.

(56) References Cited

U.S. PATENT DOCUMENTS

| | | | | |
|---|---|---|---|---|
| 6,041,128 | A | * 3/2000 | Narisawa | H04R 25/602 381/322 |
| 6,751,327 | B1 | 6/2004 | Richard | |
| 2004/0073275 | A1* | 4/2004 | Maltan | A61N 1/36038 607/57 |
| 2017/0134869 | A1* | 5/2017 | Renken | H04R 25/602 |
| 2018/0338209 | A1* | 11/2018 | Chan | A61N 1/3787 |

FOREIGN PATENT DOCUMENTS

| | | |
|---|---|---|
| EP | 1 398 841 B1 | 11/2009 |
| EP | 2 672 733 B1 | 7/2016 |
| EP | 1 100 138 B1 | 4/2017 |
| EP | 3 032 611 B1 | 4/2017 |
| WO | 0108444 A2 | 2/2001 |

OTHER PUBLICATIONS

European Patent Office, International Searching Authority, International Search Report for PCT/EP2017/078892, dated May 16, 2019, Rijswijk, Netherlands.

* cited by examiner

*Primary Examiner* — Sean H Nguyen
(74) *Attorney, Agent, or Firm* — ALG Intellectual Property, LLC

(57) ABSTRACT

The disclosed technology comprises a non-metallic rechargeable battery casing for a hearing device. For example, the battery casing comprises a polymer or plastic that encapsulates the battery chemistry (e.g., Li-Ion). The battery design has no additional metallic layers or metallic casing; rather, the battery is comprised of non-metallic lid, non-metallic can, and the battery chemistry is inside the non-metallic lid and can.

18 Claims, 4 Drawing Sheets

US 11,197,110 B2

RECHARGEABLE BATTERY WITH NON-METALLIC CASING FOR A HEARING DEVICE

TECHNICAL FIELD

The disclosed technology includes a hearing device with a non-metallic battery case. For example, a hearing device with a rechargeable Li-ion battery with a plastic battery casing.

BACKGROUND

Hearing devices are generally small and complex devices. Hearing devices can include a processor, radio, microphone and other sensors, speaker, memory, housing, and other electronical and mechanical components. Some example hearing devices are Behind-The-Ear (BTE), Receiver-In-the-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and budget.

As hearing device technology develops, users prefer hearing devices with more functionality. For example, users want rechargeable batteries because replacing batteries is inconvenient and costly for the user. Additionally, users want hearing devices that have a long battery life (e.g., lasting a full day or more for rechargeable batteries). However, additional functionality such as rechargeable and long lasting batteries may require changes to a hearing device and with these changes there are additionally challenges.

One hearing device is disclosed in WO2014008317 filed Jul. 2, 2013 (also referred to as "Vorperian"). Vorperian discloses a hearing aid that is charged via inductive charging. Vorperian's hearing device includes an inductor positioned next to a battery of the hearing aid. Vorperian also discloses a rechargeable battery with a metallic casing. However, Vorperian's system has drawbacks and disadvantages such has the amount of heat dissipated during charging periods. For example, the Li-ion battery disclosed in Vorperian operates less efficiently as it heats up. Accordingly, there exists a need to improve upon this technology.

Figure 1:
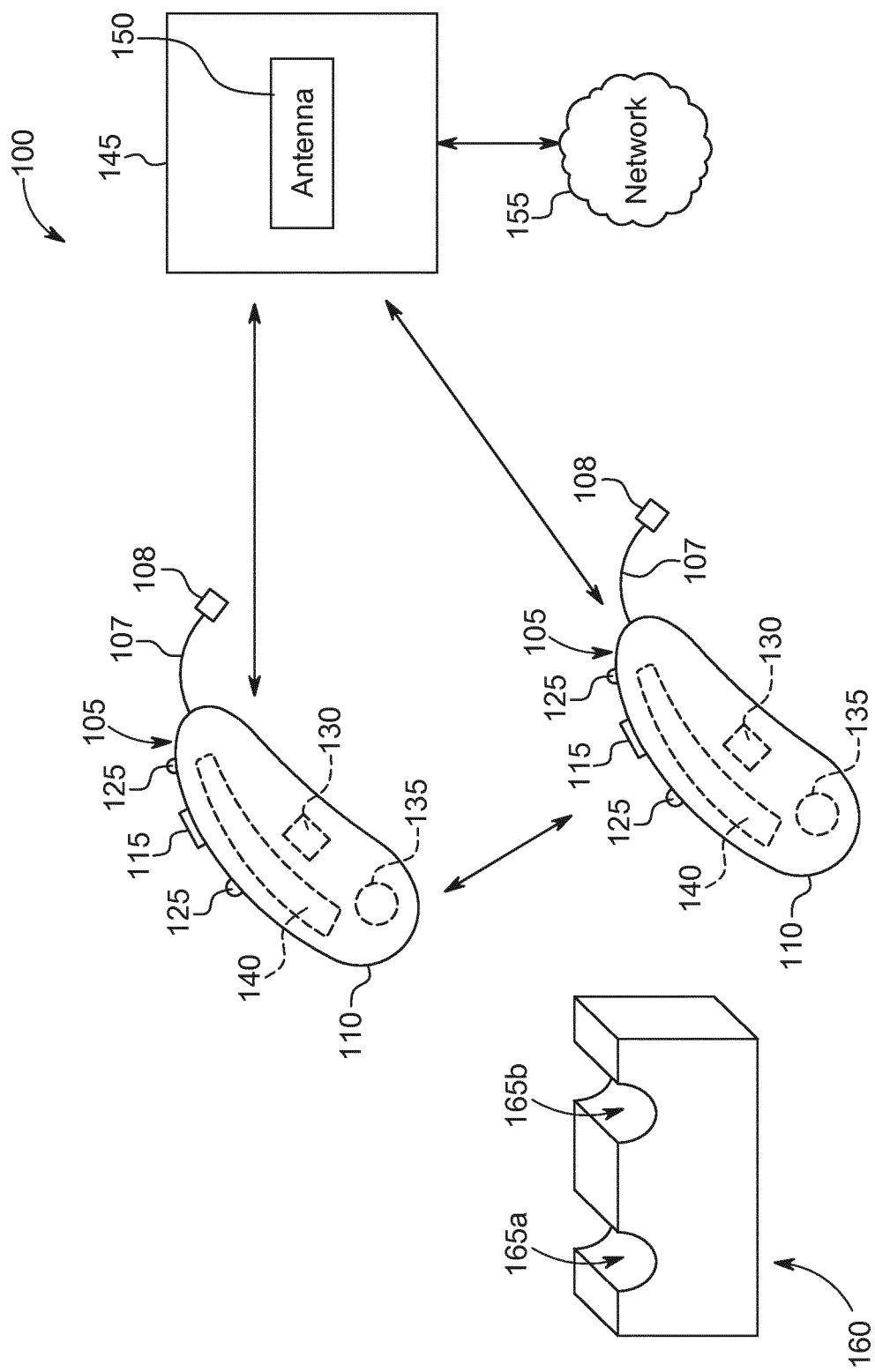
FIG. 1 illustrates a communications environment with a hearing device, electronic device, and network in accordance with some implementations of the disclosed technology.

The drawings are not drawn to scale and have various viewpoints and perspectives for some implementations of the disclosed technology. Additionally, some components or operations illustrated in the Figures can be separated into different blocks or combined into a single block for the purposes of discussion. The disclosed technology is intended to cover all modifications, equivalents, and alternatives falling within the scope of the disclosed technology by the claims.

DETAILED DESCRIPTION

Hearing devices, such as Vorperian's system (Background), generally use batteries with a metallic casing that is prone to corrosion. For example, in a hearing device that has a closed housing or limited air circulation, water or sweat might build up in the hearing device and corrode the metallic battery casing. Additionally, even more corrosion occurs because of electro-corrosion from the electronic potential between electrodes of the metallic battery and residual sweat or other conductive substances transported to the battery surface over time.

In addition to corrosion, batteries with metallic casing have another disadvantage related to wireless charging and eddy currents. Induction wireless charging induces eddy currents in metallic structures due to Faraday's law of induction. These eddy currents induce heat into metallic conductive structures due to the resistivity of the metallic case. Because a rechargeable battery should not heat up too much during charging, any additional heating is unwanted. Although the eddy currents can be controlled, e.g., by reducing either the electro-magnetic field strength or the frequency of the field variation for inductive charging, reducing field strength and reducing frequency variation have negative consequences such as prolonging charging time or requiring larger components. These disadvantages are exacerbated in tropic or sub-tropic areas where the average daily temperature is already close to the maximum charging temperature of many batteries (e.g. Li-Ion batteries). Accordingly, a needs exists for hearing devices with wirelessly rechargeable batteries that reduce heat production and reduce eddy currents to improve performance and operation of the hearing device.

In contrast to rechargeable batteries with a metallic case, the disclosed technology includes a non-metallic casing for a rechargeable battery for a hearing device. The non-metallic battery casing is defined as the material that surrounds or encompasses the battery chemistry, e.g., a can, lid, or other polymer or plastic cover. The polymer or plastic can be an aromatic polymer that is relatively unreactive, inert, and resistant to battery chemistry reactions or fire. The battery has no metallic layers or metallic casing; rather, the battery is comprised of non-metallic lid, non-metallic can, and the battery chemistry (e.g., anode, separator, cathode, electrolyte, current collectors) inside the lid and can. In some implementations, the battery casing comprises a polymer that encapsulates the battery chemistry, where the battery chemistry can be Li-Ion, Silver-Zinc, or Zinc-Air. The disclosed battery casing differs from traditional batteries because traditional batteries have a metal casing for the battery chemistry, and for various reasons described in this application, that is a disadvantage for battery performance. In other words, the disclosed battery technology operates with a metal jacket or metal layer between the battery and battery chemistry.

In addition, the non-metallic battery casing includes a protrusion to secure or hold the battery to the hearing device. A protrusion is something that protrudes from the battery casing. The protrusion can be a bump, lump, knob, hump, or projection. The protrusion can form a circle, oval, bar, evaluated bump, or other shape configured to be a securing or holding point. In some implementations, the protrusion is configured to be physically coupled to a battery holding structure or the hearing device structure. See FIGS. 2 and 3A-3D for more details regarding the protrusion. In some implementations, the protrusion is the means for securing or holding the battery within the housing for the hearing device.

The non-metallic battery casing has at least one benefit. For example, one benefit is that a non-metallic battery casing reduces heat generation in the battery compared to metallic battery cases because non-metallic battery casing is a poor heat conductor. As a result, a charger can increase the charging field strength to reduce charging time or improve battery life through lower temperatures while charging. In some implementations, another benefit is that the non-metallic battery reduces corrosion because plastic does not corrode. Even more, a non-metallic battery casing reduces the electromagnetic interference between a high frequency antenna (e.g. at 2.4 GHz) of a hearing device and the battery. The reduction of interference improves the performance of the hearing device, e.g., by enabling an improved wireless radiation pattern and more reliable communication.

Here are some definitions of terminology that apply to this disclosure.

| Term | Definition |
| --- | --- |
| A hearing device | is a device that provides audio to a user; some example hearing devices include a hearing aid, headphones, active hearing protection devices, earphones, assisted listening devices, or any combination thereof; and hearing devices also include both prescription devices and non-prescription devices configured to be worn on a human head. |
| A hearing device component | is a component coupled to a hearing device; some example hearing device components include a sound tube, housing, processor, and transducer. |
| A hearing aid or active hearing protection | is a device that provides amplification or attenuation to a signal; some example hearing aids include a BTE, RIC, ITE, CIC, or IIC hearing aid. |

Beginning with a detailed description of the Figures, FIG. 1 illustrates an example of a hearing environment 100. The hearing environment 100 includes hearing devices 105, housing 110 for the hearing devices 105, tube 107 (e.g., to enable the transfer of sound or transfer of an electrical signal), transducer 108 (e.g., speaker), user input 115 (also referred to as a "user control") for the hearing devices 105, sound entrances 125 (e.g., enable sound to travel through an entrance to microphone within the hearing device 105), processor 130, battery 135 (e.g., a rechargeable Li-ion battery), and antenna 140.

FIG. 1 shows processor 130, the battery 135, and the antenna 140 with dashed lines to indicate that these hearing device components are partially or completely inside the housing 110. The hearing devices 105 can lack a battery door and encapsulate the processor 130, the battery 135, and the antenna 140 to form one continuous piece of the housing 110. As a result, a user may not open or have access to the interior of the hearing devices 105.

FIG. 1 also illustrates a charging station 160. The charging station 160 has inlets 165a and 165b for storing or holding the hearing devices 105 for wireless charging. In some implementations, the inlets 165a and 165b are custom shaped to fit the hearing devices 105. In other implementations, the inlets 165a and 165b are a generic shape (e.g., circle, square) that forms an area for wireless charging. The charging station 160 is configured to transmit wireless power. The wireless power can be transmitted through induction or related means using an electromagnetic field. The frequency for inductive charging can be 50 to 300 kHz, approximately 6.7 MHz, or frequency for an industrial, scientific, and medical (ISM) band. The ISM bands can include 6.765 MHz to 6.795 MHz, 13.553 MHz to 13.567 MHz, 26.957 MHz to 27.283 MHz, 40.66 MHz to 40.7 MHz, 433.05 MHz to 434.79 MHz, 902 MHz to 928 MHz, 2.4 GHz to 2.5 GHz, or 5.725 GHz to 5.875 GHz. The frequency for charging can be selected based on desired charging time, charging temperature, size of battery, and availability or capability of the charging station 160 to supply power at a frequency. In some implementations, it is preferred to oscillate an electromagnetic charging field below 7 MHz, preferably below 300 kHz, where the electromagnetic charging field is applied to a hearing device and the hearing device includes a rechargeable battery configured to power the battery.

Although the charging station 160 is shown as a box or storage area, the charging station can also be a pad or contact area where a user can place the hearing devices 105 for wireless charging. If the charging station 160 is using inductive charging, the charging station 160 can include a coil to generate a magnetic field.

FIG. 1 also includes an electronic device 145 with an antenna 150 for the electronic device 145 and network 155. The hearing devices 105 can communicate with the electronic device 145 or the hearing device 105 can communicate with the network 155 via the electronic device 145. Although two hearing devices 105 are shown in FIG. 1, the hearing environment 100 can include a single hearing device or two hearing devices where only one is configured to communicate wirelessly.

The electronic device 145 can be a mobile phone, smart phone, tablet computer, laptop computer, desktop computer, a media device, a gaming device, virtual or augmented reality headset, vehicle-based computer, wearable computing device, or portable electronic device. In some implementations, the electronic device 145 includes software or a mobile application that controls or communicates with the hearing device 105. In some implementations, the hearing device 105 can communicate with the electronic device 145 using, e.g., Bluetooth™ or ZigBee™, or any proprietary protocol where signals are propagated between the antenna 140 and the antenna 150 (e.g., bidirectional or unidirectional communication). The hearing devices 105 can also communicate with each other (e.g., binaural communication). Each component of the hearing devices 105 is described below in more detail.

The hearing device 105 can receive input from the user input 115. For example, a user can push the user input 115 to signal pairing (e.g., Bluetooth Pairing™) the hearing device 105 with another device such as the electronic device 145. In some implementations, a user can stream music or conduct a phone call with the hearing devices 105 and the electronic device 145.

The processor 130 controls and processes information for the hearing device 105. The processor 130 can include special-purpose hardware such as application specific integration circuits (ASICS), programmable logic devices (PLDs), field-programmable gate arrays (FPGAs), programmable circuitry (e.g., one or more microprocessors microcontrollers), Digital Signal Processor (DSP), appropriately programmed with software and/or firmware, or a combination of special purpose hardware and programmable circuitry. In some implementations, the processor 130 is physically and electronically coupled to memory such as volatile memory, nonvolatile memory and dynamic memory.

The network 155 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The network 155 can include communication networks such as a Global System for Mobile (GSM) mobile communications network, a code/time division multiple access (CDMA/TDMA) mobile communications network, a $3^{rd}$, $4^{th}$ or $5^{th}$ generation (3G/4G/5G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network such as a Wireless Local Area Network (WLAN). In general, the network 155 enables the hearing devices 105 to send and receive information from the Internet via the electronic device 145. For example, the network 155 can be a Wi-Fi™ network or a networking implementing a IEEE 802.11 standard.

To wirelessly communicate with other devices, the hearing devices 105 use the antenna 140. The antenna 140 is configured to transmit and receive wireless communication signals in frequency bands (e.g., in the 2.4 GHz frequency band for Bluetooth Classic™, Bluetooth Low Energy™, or a range of frequencies from 1 to 6 GHz, where 1.2 GHz or 5 GHz are preferred, 1.2 GHz requires less energy and 5 GHz can improve communication signal performance). As shown in FIG. 1, the antenna 140 can be completely inside the housing 110 (e.g., plastic housing). However, in some implementations, the antenna 140 can be partially or completely outside of the housing 110 depending on desired transmission and propagation properties. For hearing devices, it is generally preferred to protect the hearing aid components from moisture or environmental conditions by having all the hearing aid components inside the housing 110. Accordingly, the housing 110 can be composed of material that enables the transmission of wireless communication signals, but also reduces moisture (e.g., plastic).

The hearing devices 105 can include additional components. For example, if the hearing devices 105 are configured for wireless inductive charging, the hearing devices can include a coil to receive a magnetic field. The coil can vary in size, shape and construction depending on the size of the hearing devices 105 and the designed power to be received by the hearing device.

Figure 2:
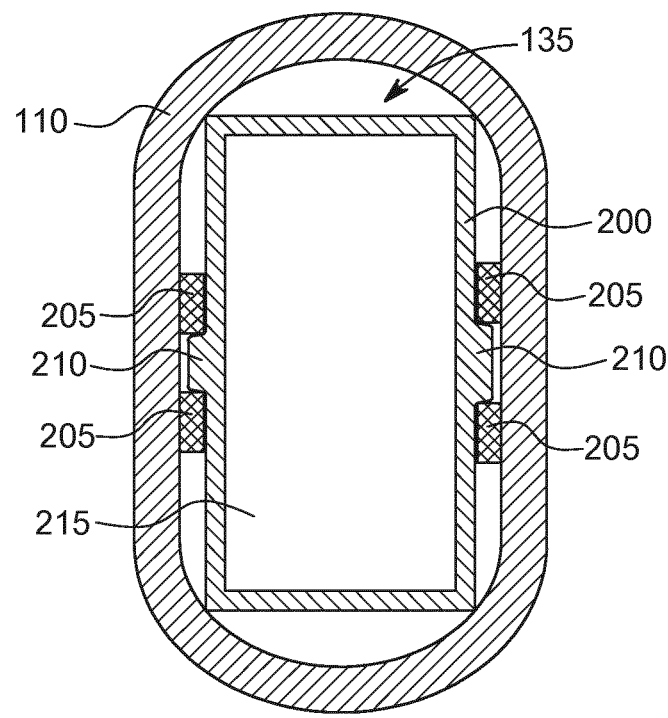
FIG. 2A is a cross-sectional view of a hearing device with a non-metallic rechargeable battery case in accordance with some implementations of the disclosed technology.

Moving now to more details about the battery 135, FIG. 2 and FIGS. 3A-3C further disclose information about the battery 135. FIG. 2 illustrates the battery 135 from a cross-sectional view with the housing 110 (FIG. 1), battery shell 200, a battery holding structure 205, protrusion 210 configured to secure or hold the battery 135 in place with the battery holding structure 205, and the battery chemistry 215. The battery 135 can be circular, oval, or another oblong shape to fit inside of the housing 110.

In some implementations, the battery holding structure 205 is a plastic material that is physically coupled or attached to the hearing device and extends towards the protrusion in order to physically coupled with it. The battery holding structure 205 can include a clipping or holding mechanism. As shown in FIG. 2, the housing 110 surrounds, encompasses, or encapsulates the battery holding structure, the battery 135, the protrusion 210, and the battery chemistry 215. Also, because the battery 135 can be a rechargeable battery, there is no need for a battery door for a user to access the interior of the hearing device to replace the battery 135.

In some implementations, the battery chemistry 215 can include an anode, cathode, separator, current collector and electrolyte. For Li-Ion batteries, the battery chemistry 215 can be recharged with a constant current ("CC")-constant voltage ("CV") profile. For example, the battery chemistry 215 can be charged at a rate of 0.5 mA within an initial CC phase, where a current that is one half of the rated capacity (e.g., 10 mA for a 20 mAh battery) is applied for charging. When the battery voltage reaches its designated maximum charge voltage (e.g., 4.2V), the voltage is kept constant over the battery (CV phase) with the charge current continuously decreasing. When sufficiently small, the charge is declared as done. The required charging current of, e.g., 10 mA can be delivered via contact pads as shown in FIGS. 3B and 3C. As such, in some implementations, a battery can get recharged in 3 hours or less.

The battery casing 200 is composed of a non-metallic material (e.g. a polymer or plastic). FIG. 2 illustrates that the battery casing 200 has no further space, layer, or protective cover surrounds the battery chemistry 215. The battery casing 200 can also be referred to as the battery shell, where casing forms the exterior surface of the battery 135, battery jacket, or battery cover. Although a non-metallic material is preferred, in some implementations, a small amount of metal may be included in the casing. For example, less than 2 percent of the battery casing chemistry can include some metallic compounds for increasing the strength of the battery casing. However, the battery casing should have substantially no or limited metal to reduce the formation of eddy currents or heat dissipation.

The battery holding structure 205 is configured to secure the battery 135 to the battery holding structure 205 by attaching, coupling, or holding the protrusion 210 of the battery 135 to secure its place as well as protect it from circular revolutions around its axis. For example, the protrusion 210 is at least on one side of the battery 135 or in the middle of the battery 135 as in FIG. 3B. In some implementations, the protrusion 210 can be elongated as in FIG. 3A and/or off-axis as in FIG. 3C. The protrusion 210 might also be on the circumference or edge of the battery 135 as shown in FIG. 3D. The battery holding structure 205 may not encompass the entire battery (e.g., FIG. 2, 3A, 3B, 3C). The battery holding structure 205 can be a shoe, bar, or elongated piece extending from the hearing device. The battery holding structure can be small and contained within the housing 110 to reduce the size of the hearing device for a more aesthetically appealing shape.

Figure 3A:
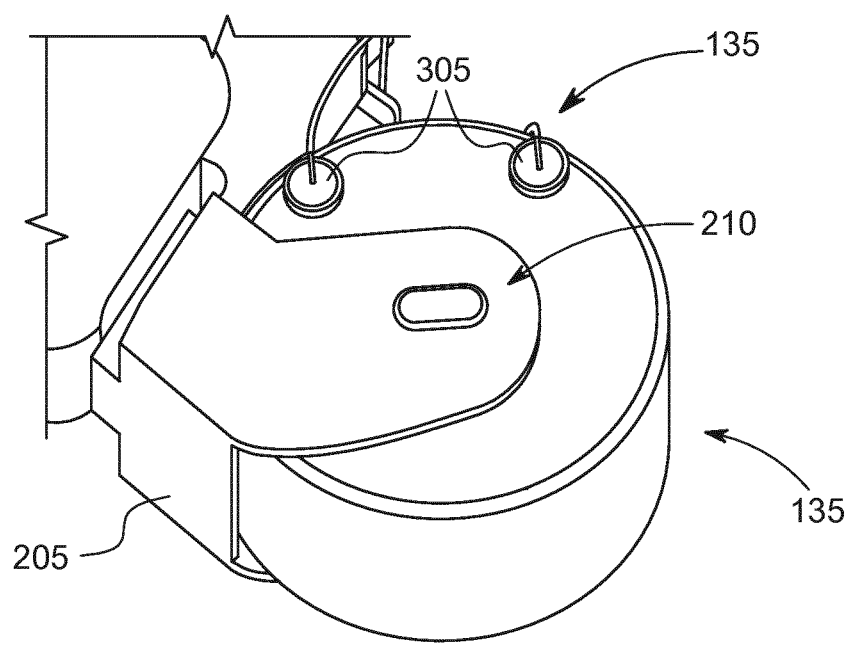
FIGS. 3A-3D illustrate perspective views of a rechargeable battery with a non-metallic case in accordance with some implementations of the disclosed technology.
Figure 3B:
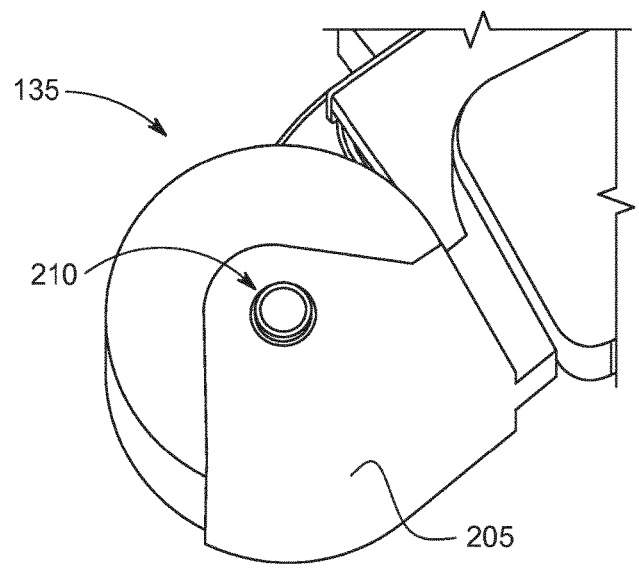
Figure 3C:
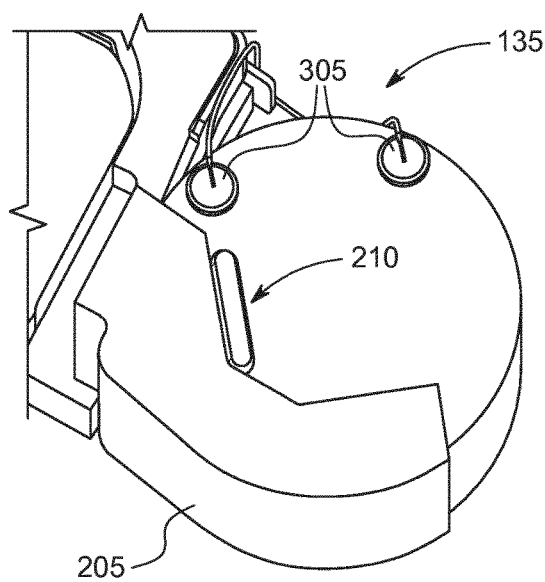
Figure 3D:
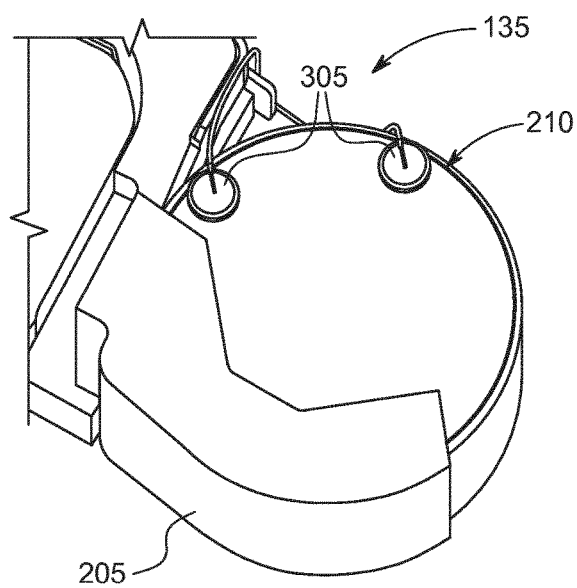

FIGS. 3A-3D illustrate various perspectives of the battery 135. In FIG. 3A, the protrusion 210 has an oblong shape in the center of the battery 135; in FIG. 3B the protrusion 210 has a circular shape in the center of the battery 135, and in FIG. 3C the protrusion 210 has an elliptical or oblong shape located away from the center. Each of the protrusions in FIGS. 3A-3D is configured to attached or couple to the battery holding structure 205. FIGS. 3C and 3D illustrate contact pads or wires 305 for transferring energy from the battery 135 to the hearing device or for transferring energy from the hearing device (e.g., from a charging circuit) to the battery. The contact pads or wires 305 can be metal or conductive material for transferring electromagnetic energy. In some implementations, the contact pads 305 can be inside the battery casing.

The protrusion 210 can also be positioned on the circumference or edge of the battery 135 as shown in FIG. 3D. As shown in FIG. 3D, the protrusion can be a beveled edge such that it can fit tongue and groove with the battery holding structure 205. In such implementations, the battery 135 is securely connected to the battery holding structure 205 and may not rotate or move against the battery holding structure 205. The battery holding structure 205 is small enough to fit inside the housing 110 (FIG. 1) and does not enlarge the housing 110, which can result in a slim or small profile for hearing device.

The protrusion 210 can be moved around or have a different shape depending on the connection mechanism between the protrusion 210 and the battery holding structure 205. The protrusion 210 can have a different shape or location to reduce manufacturing costs or to increase holding strength (e.g., robust connection) between the protrusion 210 and the battery holding structure 205. In some implementations, the battery 135 or the battery casing 200 can include multiple protrusions 210 to provide securing forces in multiple locations.

Figure 4:
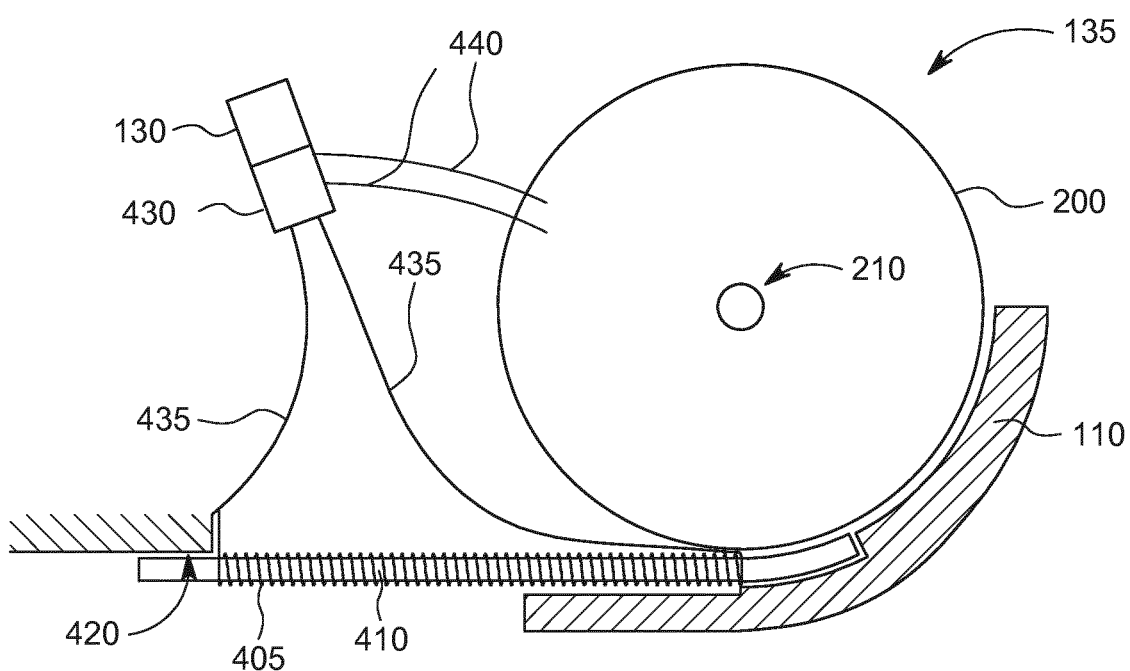
FIG. 4 is a schematic view for wirelessly charging a rechargeable battery with a non-metallic case in accordance with some implementations of the disclosed technology.

FIG. 4 schematic view for wirelessly charging a rechargeable battery with a non-metallic case for the battery 135. FIG. 4 illustrates the battery 135, the battery shell 200, the protrusion 210, the processor 130, and the housing 110 (not shown completely for simplicity). FIG. 4 also illustrates components for wirelessly charging the battery 135: ferrite material 405, coil 410, charging circuit 430 configured to connect charging circuit wires 435 to the coil 410 and regulate power supply to and from the battery, power wires 440 from the charging circuit 430 to the battery 135. In some implementations, a wireless power charger (e.g., charging station in FIG. 1) generates an electromagnetic field or charging field at a frequency (e.g., FIG. 1 ISM band wireless power transmission) and the electromagnetic field is received by the coil 410. The coil 410 transmits current to the charging circuit 430 via charging circuit wires 435. The coil 410 comprises a conductive material such as copper wire. The charging circuit 430 can rectify, filter, or regulate the current or power received from the coil 410. For example, the charging circuit can regulate the voltage (e.g., 1 V to 4.2 V) or current supplied to the battery 135. The processor 130 can control the charging circuit 430 or the charging circuit 430 can operate independent from the processor 130. Although FIG. 4 illustrates the charging circuit 430 connected to the processor 130, the charging circuit can be physically separated from the processor 130. The power from the charging circuit 430 is transferred from the charging circuit 430 to the battery 135 via power wires 440.

Receiving coils for wireless charging need to occupy a reduced (e.g., the least) amount of space in a hearing device. In some implementations, a preferred solution places the wireless charging coil at the bottom of the hearing device, but still in close proximity of the battery (FIG. 4). In some implementations, the coil is kept flat (e.g., less than 1.5 mm), but might use the entire width of the interior of the hearing device (e.g., 5 mm). The length of such a coil is according to the required number of turns but in general is less than 15 mm, preferably less than 10 mm. The ferrite 405 core may be slightly longer than the space needed for the windings, useful to taper down the height and/or width of the component and providing a surface area to glue the coil to the frame and/or battery respectively.

Adhesive 420 can provide additional structural or mechanical support for the coil 410. For example, the adhesive 420 can be used to secure the coil 410 inside the hearing device, e.g., inside the housing 110. Additionally, the ferrite 405 is include to increase the received amount of electromagnetic energy for wireless charging. The ferrite 405 can be a sleeve, tube, or other approximately round configuration for wrapping the coil 410 around. The amount of adhesive 420, size of the coil 410, size or shape of the ferrite 410 can vary based on the size of the hearing device, the power requirements of the hearing device, or the properties of the battery 135.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, electromagnetic, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements. For example, the disclosed technology can be applied to earbuds, headphones, or electronic devices with encapsulated batteries.

In the following description, for the purposes of explanation, numerous specific details are set forth in order to provide a thorough understanding of implementations of the disclosed technology. It will be apparent, however, to one skilled in the art that embodiments of the disclosed technology may be practiced without some of these specific details. While, for convenience, implementations of the disclosed technology are described with reference to hearing device by customizing aesthetic and functional features/content, implementations of the disclosed technology are equally applicable to various other electronic devices and wireless communication equipment. For example, the disclosed technology can be used in an earbud, headphone, or other listening device.

The following example implementations include various configurations of a hearing device in accordance with the disclosed technology. For example, a hearing device, comprising: a housing; a processor positioned within the housing; a microphone electrically coupled to the processor; a transducer electrically coupled to the processor; a battery holding structure; and a battery, wherein the battery further comprises: a rechargeable battery, a non-metallic casing, and wherein the non-metallic casing includes a protrusion configured to secure or hold the battery, and wherein the housing encapsulates or surrounds the rechargeable battery, the processor, or the battery holding structure. In some implementations, the non-metallic casing is made of plastic or polymer, thus not being prone to corrosion and thus not requiring a fully encompassing protective cover. In some implementations of this example, the protrusion is circular, oblong, or elliptic shape such as a plastic bump on the exterior surface of the battery casing.

The battery can be charged using induction with power transferred from the charger to the hearing aid through an electromagnetic field. Due to the non-metallic battery case, the battery is less heated through eddy currents from the electromagnetic charging field. The hearing device also communicate with other devices (e.g., hearing aid, smart phone, computer, handheld electronic device) using a wireless communication protocol such as Bluetooth, ZigBee, Wi-Fi, binaural communication (e.g., 3-11 MHz frequency communication signals between hearing aids). The battery chemistry can be Li-ion. For charging the hearing device, in some implementations, the hearing device is configured to receive wireless power through an electromagnetic charging field, wherein the electromagnetic charging field oscillates below 7 MHz.

In some implementations, the means for holding or securing the battery casing can be the protrusion, where the protrusion is a bump in e.g. a circular, oblong, or elliptic shape and can be on any side of the battery. The protrusion can be physically coupled to a battery holding structure, where the battery holding structure is a component of a hearing device, the holding structure not needing to encompass the battery by more than 180° to securely hold the battery in place. In some implementations, the battery consists of battery chemistry, leads or wires, and battery chemistry, which means there is no metal layer or additional casing surrounding the battery chemistry.

What is claimed:

1. A hearing device, comprising:
    a housing;
    a processor positioned within the housing;
    a rechargeable battery comprising:
        battery chemistry; and
        a non-metallic casing that encapsulates the battery chemistry of the rechargeable battery; and
    a battery holding structure configured to secure the rechargeable battery within the housing,
    wherein the housing surrounds the rechargeable battery, the processor, and the battery holding structure.

2. The hearing device of claim 1, wherein the non-metallic casing includes a protrusion configured to secure or hold the rechargeable battery.

3. The hearing device of claim 2, wherein the protrusion has a circular, oblong, or elliptic shape.

4. The hearing device of claim 1, wherein the non-metallic casing comprises plastic or polymer.

5. The hearing device of claim 1, wherein the battery holding structure is configured to attach to a protrusion on the non-metallic casing such that the battery holding structure prevents the rechargeable battery from moving or rotating.

6. The hearing device of claim 1, further comprising: a coil, wherein the coil is configured to receive wireless power from an electromagnetic charging field, and wherein the electromagnetic charging field oscillates below 7 MHz.

7. The hearing device of claim 1, wherein the hearing device is configured to receive wireless power through an electromagnetic field.

8. The hearing device of claim 1, wherein the battery chemistry is Li-ion battery chemistry.

9. The hearing device of claim 1, wherein the battery holding structure comprises a plastic material extending from the hearing device, and wherein the battery holding structure is configured secure the rechargeable battery in a position and prevent the rechargeable battery from rotating by physically coupling to a protrusion on the non-metallic casing.

10. The hearing device of claim 1, wherein the rechargeable battery includes metallic contact pads, metallic leads, or metallic wires to transfer power from the rechargeable battery to the hearing device.

11. The hearing device of claim 1, wherein the rechargeable battery consists of the non-metallic casing, wires or leads, and the battery chemistry.

12. The hearing device of claim 1, further comprising: a charging circuit coupled to the processor, wherein the processor is configured to control the charging circuit.

13. The hearing device of claim 1, wherein the non-metallic casing includes a protrusion configured to secure or hold the rechargeable battery, and wherein the protrusion is positioned on an edge of the rechargeable battery where the rechargeable battery is has a circular shape.

14. The hearing device of claim 1, wherein the non-metallic casing is in direct contact with the battery chemistry.

15. A hearing device, comprising:
    a housing;
    a coil configured to receive an electromagnetic field positioned within the housing;
    a processor positioned within the housing;
    a rechargeable battery comprising:
        battery chemistry; and
        a non-metallic casing that encapsulates the battery chemistry of the rechargeable battery; and
    means for securing or holding the rechargeable battery within the housing, wherein the means is physically coupled to the non-metallic casing; and
    wherein the housing surrounds the rechargeable battery, the processor, the coil, and the means for securing or holding the rechargeable battery.

16. The hearing device of claim 15, wherein the non-metallic casing comprises plastic.

17. The hearing device of claim 15, wherein the hearing device is configured to communicate wirelessly with a computing device or another hearing device.

18. The hearing device of claim 15, wherein the hearing device further comprises a charging circuit configured to provide energy to the rechargeable battery.

* * * * *